United States Patent [19]
Strubbe

[11] Patent Number: 4,765,190
[45] Date of Patent: Aug. 23, 1988

[54] FLOW METERING DEVICE

[75] Inventor: Gilbert J. I. Strubbe, Zedelgem, Belgium

[73] Assignee: Ford New Holland, Inc., New Holland, Pa.

[21] Appl. No.: 878,732

[22] Filed: Jun. 26, 1986

[30] Foreign Application Priority Data

Jul. 12, 1985 [EP] European Pat. Off. ......... 85/201187

[51] Int. Cl.[4] .............................................. G01F 1/28
[52] U.S. Cl. .............................. 73/861.72; 73/861.73; 56/DIG. 15; 56/102; 222/71
[58] Field of Search ...................... 73/861.72, 861.73; 56/10.2, DIG. 2, DIG. 15; 222/40, 55, 71

[56] References Cited

U.S. PATENT DOCUMENTS

| 2,748,601 | 6/1956 | Clinard . | |
| 2,804,771 | 9/1957 | Brown | 73/861.72 |
| 3,049,919 | 8/1962 | Roth | 73/861.72 |
| 3,206,978 | 9/1965 | Aronow | 73/861.72 |
| 3,606,745 | 9/1971 | Girodat | 56/DIG. 15 |
| 3,774,446 | 11/1973 | Diehl . | |

FOREIGN PATENT DOCUMENTS

| 2233711 | 1/1974 | Fed. Rep. of Germany . |
| 2947414 | 5/1981 | Fed. Rep. of Germany . |
| 3045728 | 7/1982 | Fed. Rep. of Germany . |
| 8500087 | 1/1985 | PCT Int'l Appl. . |
| 121161 | 11/1970 | United Kingdom . |
| 1378715 | 12/1974 | United Kingdom . |
| 1506329 | 4/1978 | United Kingdom . |
| 2100568 | 1/1983 | United Kingdom . |
| 2087704 | 9/1983 | United Kingdom . |

Primary Examiner—Herbert Goldstein
Attorney, Agent, or Firm—Larry W. Miller; Frank A. Seemar; Darrell F. Marquette

[57] ABSTRACT

In a combine harvester having a clean grain conveyor, a clean grain weight rate metering device is provided generally at the discharge end of said conveyor. The weight rate metering device includes a sensor member disposed to be acted upon by the clean grain flow as it issues from the clean grain conveyor, and a transducer operatively associated with the sensor member to continuously generate a signal proportional to the clean grain weight rate. The sensor member is curved in shape and is operatively disposed generally in the path of the clean grain flow issuing from the conveyor for deflecting the direction of movement of the clean grain flow and for guiding said flow therealong while subjecting the sensor member to a centrifugal force. The inventive concept also may be used in a flow metering device for metering the weight rate of any type of materials flow and generally always comprises conditioning means forwardly of the sensor member for concentrating, in a coherent stream, all the material of the materials flow and for transferring said coherent stream to the sensor member for guiding said coherent stream in permanent contact with the sensor surface as it is moved through the sensor member.

15 Claims, 3 Drawing Sheets

FLOW METERING DEVICE

BACKGROUND OF THE INVENTION

This invention relates to flow metering devices in general and to a clean grain flow metering apparatus for use on a combine harvester in particular.

When harvesting crop material with a combine harvester, the operator is not readily able to determine the amount of clean grain being gathered in relation to either the time being spent or the acreage being covered. This only can be determined subsequently, by physically weighing the grain obtained over a measured acreage during a given period of time. The only assistance given in this respect is by an acreage counter, which is provided on some combine harvesters to provide a cumulative measure of the acreage which has been harvested. Acreage counters are shown, for example, in GB. No. 1.358.178 and DE. No. 2.208.005.

However, with the various aids in the way of fertilizers and weed, pest and disease controllers presently available to farm management, it is very frequently required to subdivide the total acreage of the crop into smaller lots, which are treated differently from one another to test the effect of differing amounts and differing types of chemical aids. The results of differing treatments can be assessed properly only by the crop yield, but with existing crop measuring techniques it is extremely difficult for a farmer accurately to determine by experiment the treatment which is best suited to his land and farming methods.

Furthermore, with the advent of automation in combine harvesters, it also is necessary to have accurate on-the-go throughput signals which can be relayed to control various harvester functions, such as automated feedrate (ground speed) control system. On-the-go throughput signals also can be combined with grainloss signals to provide an instantaneous grainloss rate as a percentage of grain harvested.

Various attempts have already been made to provide a grain flow metering device. Some of the prior art devices provide volumetric measurements. However, weights and weight rates are preferred over volumetric measurements. Conversion of volume to weight is, of course, possible by using the specific weight figures for grain. However, exact specific weight figures vary greatly from crop location to crop location, such that, it is usually necessary to measure these values. In practice, it has been found that the conversion of volume to weight seldomly is done accurately and often is a cause for substantial errors. Examples of volumetric flow rate metering devices are found in EPC. No. 42,245 and DE. No. 3,045,728.

GB. No. 1.211.161 shows an impact counter wherein grain kernels are caused to impact against a sensor plate and the impacts are counted. However, this measurement principle cannot be used to produce a weight rate signal as the frequency of impacts is not proportional to the weight of the grain flow.

GB. No. 1.506.329 discloses a weight rate metering apparatus in addition to volumetric metering devices for use on a paddle type clean grain elevator of a combine harvester. The weight rate metering device comprises a spring loaded sensor plate which is mounted to swivel about its shaft and which projects into the path of the grain kernels at the discharge end of the clean grain elevator. Connected to the plate shaft is a potentiometer or the like which is coupled to an electronic signal processing circuit and to a display means. Depending on the variable quantity of grain which impinges on the plate and, on the kinetic energy of said grain, the plate is swung to a greater or lesser degree from its starting position opposite to the spring force acting thereon.

This results in the potentiometer generating a signal which is representative of the weight of grain actually being conveyed. It is remarked however that the sensor plate, which is mounted in the path of the grain, forms an obstruction to said grain flow which often causes plugging of the conveyor means. Moreover, the angular displacement of the plate is, by far, not proportional to variations in the flow rate as indeed, when the plate is in its initial position, a given increase in the flow rate will result in a much larger angular displacement of the sensor plate than when said sensor plate already assumes an inclined position.

The use of impaction as a method of measuring the weight rate of particulate material in general also is already employed in the farm machinery industry. In impact flow meters of this type, the material to be measured falls from a predetermined distance onto an impact sensing device which may comprise either a flat reflecting plate installed at an angle of about 30° to the vertical in the flow path or a curved chute along which the flow of falling material is deflected. The forces exerted on the reflecting plate or curved chute are measured as an indication of the weight rate. These gravity impact flow meters have specific disadvantages which are described in greater detail below.

SUMMARY OF THE INVENTION

It is an object of the present invention to provide a weight rate metering device in general, as well as a grain flow metering apparatus for measuring grain weight rates in a combine harvester.

It is a feature of this invention that the weight rate metering device is relatively compact in construction.

It is an advantage of this invention that the weight rate metering device is less sensitive to variations in inclination when installed on a mobile machine.

It is another advantage of this invention that the weight rate metering device does not obstruct the flow of material, thereby eliminating the risks for plugging and adversely influencing throughput capacity of the conveyor means incorporating the metering device;

It is another feature of this invention that the weight rate metering device is self-cleaning to eliminate adverse affects of encrustation on the sensor member;

It is still another advantage of this invention that improved accuracy of measurements by conditioning the flow prior to entering the sensor means can be obtained;

It is yet another advantage of this invention that the measurements are influenced to a lesser degree by frictional and other physical characteristics of the material that has been previously known in the art.

It is another object of this invention to provide a flow metering device is provided for metering the weight rate of a material flow in a conveyor means which has a curved sensor member disposed to receive the materials flow at an inlet and to deflect and guide said materials flow in an arcuate path along its sensor surface while being subjected to centrifugal forces resulting from the deflection of the path of movement of the materials flow; a load cell associated with the curved sensor member and operable to generate a signal proportional to said centrifugal forces; and signal processing means coupled to the load cell for generating an indication of the weight rate of the materials flow.

The invention is characterized, on the one hand, in that feeder means are provided forwardly of the sensor member for inducing a minimal speed to the materials flow and, on the other hand, in that conditioning means are provided between the feeder means and the curved sensor member for concentrating, in a coherent stream, all the material of the materials flow received from the feeder means and for transferring said coherent stream to the sensor member at an outer radius thereof for guiding said coherent stream along said sensor member in permanent contact with the sensor surface thereof.

In a preferred embodiment of the invention, the conditioning means are formed by a bend in the conveyor means such that, material flowing therethrough at a predetermined speed, is concentrated, by centrifugal action, into a coherent stream at the outer radius of the bend. The sensor member of this preferred embodiment has its sensor surface disposed in material receiving relationship to the outer radius of the conditioning means. The sensor surface at the inlet of the curved sensor member is positioned generally between a tangential position to the path of the materials flow as it issues from the conditioning means and a position inclined inwardly with respect to said tangential position. Preferably, the curved sensor member is resiliently mounted and the load cell is a linear displacement sensor. However, alternatively, the sensor member may be fixedly mounted and the load cell may be operable to sense forces rather than actual displacements.

According to a more specific aspect of the invention, a crop weight rate metering device (such as a clean grain weight rate metering device) is associated with the discharge end of a crop material conveyor means of a combine harvester and includes a sensor member disposed to be acted upon by the crop materials flow as it issues from the conveyor means and a transducer operatively associated with the sensor member to generate a signal proportional to the crop material weight rate.

The invention is characterized in that the sensor member is curved in shape and is operatively disposed generally in the path of the crop materials flow issueing from the conveyor means for deflecting the direction of movement of the crop materials flow and for guiding said flow therealong while subjecting the sensor member to a centrifugal force.

Preferably the sensor member includes a generally circularly curved sensor surface which is disposed to receive the crop materials flow at an inlet and to deflect and guide the crop materials flow therealong while being subjected thereby to said centrifugal force, the sensor surface at the inlet of the sensor member being positioned generally between a tangential position to the path of the crop materials flow as it issues from the conveyor means and a position inclined inwardly with respect to said tangential position. In a preferred embodiment the sensor member is positioned such that the tangential to the sensor surface at the inlet is inclined inwardly with an angle in the range of 5° relative to the direction of the crop materials flow as it issues from the conveyor means.

The sensor member preferably is resiliently mounted relative to the discharge end of the conveyor means for allowing displacement generally in the direction of the bisector of the sensor surface under influence of said centrifugal force. The transducer is formed by a load cell which is disposed to sense said displacement and to generate an electrical signal which is generally proportional to the weight rate of the crop material acting upon the sensor surface. Alternatively, the sensor member may be fixedly mounted and the transducer may be formed by a load cell which is operable to directly sense a force rather than to sense a displacement proportional to centrifugal force.

The conveyor means includes crop flow conditioning means forwardly of the sensor member for concentrating the crop materials flow in a coherent stream. The sensor member has its sensor surface disposed with its inlet in crop material receiving relationship to the conditioning means for allowing all the material of the crop materials flow to continuously act upon said sensor surface as it is guided along the length thereof.

Preferably the crop conveyor means are in the form of a paddle-type elevator having an elongated housing with a generally rectangular cross section and an endless paddle conveyor extending and movable around upper and lower guide means in the elevator housing. The conditioning means are formed by the paddles of the paddle conveyor as they move around the upper guide means, in conjunction with a transverse wall section of the elevator housing extending generally around the upper guide means and forwardly of the elevator outlet. The arrangement is such that, in operation, crop material is conveyed by the paddles around the upper guide means and is centrifugally urged radially outwardly against said transverse wall section to form said coherent stream prior to being transferred to the sensor member.

The crop weight rate metering device according to the invention also includes an electronic circuitry including signal processing means. The load cell associated with the sensor member together with an acreage counter are operatively coupled to the electronic circuitry. The arrangement is such that the signal processing means are operable, on the base of the outputs received from the load cell and the acreage counter to produce a signal indicative of the crop weight rate (e.g., tons per hectare).

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

The terms "grain", "straw", and "tailings" are used principally throughout this specification for convenience and it should be understood that these terms are not intended to be limiting. Thus "grain" refers to that part of the crop which is threshed and separated from the discardable part of the crop material which is referred to as "straw". Incompletely threshed ears are referred to as "tailings". Also, the terms "forward", "rearward", "upper", "lower", "left", right", etc. when used in connection with the combine harvester and/or components thereof, are determined with reference to the combine harvester in its normal operational condition and may refer either to the direction of forward operative travel of the combine harvester or to the direction of normal material flow through components thereof. These terms should not be construed as limiting.

Figure 1:
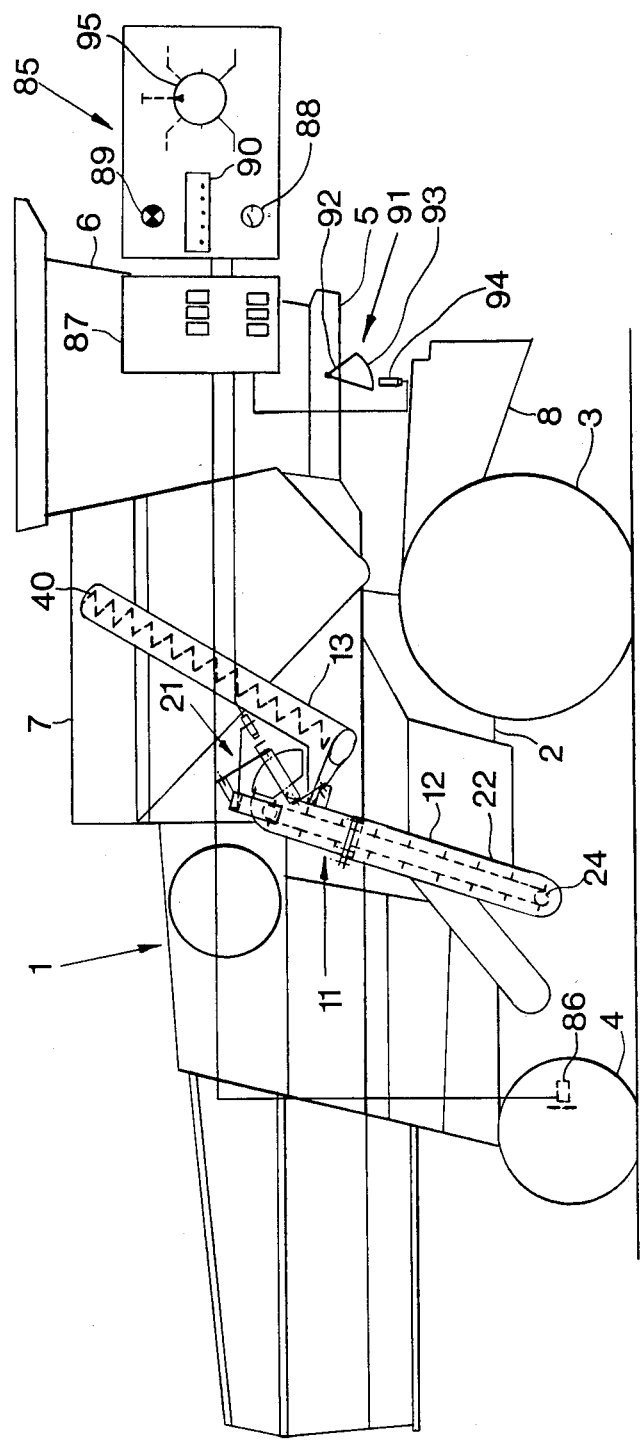
FIG. 1 is a left-hand side elevational view of the combine harvester embodying the weight rate metering device according to the invention in combination with the clean grain elevator.

A combine harvester embodying the present invention will now be described in greater detail and by way of example, with reference to the accompanying FIGS. 1 and 2. The broader concept of the invention subsequently will be described with reference to FIG. 3. A typical combine harvester 1 as is shown in FIG. 1, is provided with a main chassis or frame 2 supported on a front pair of traction wheels 3 and a rear pair of steerable wheels 4. Supported on the main chassis 2 are an operator's platform 5 with cab 6, a graintank 7, a threshing and separating mechanism (not shown), a grain cleaning mechanism (not shown) and an engine (also not shown). The engine provides the motive power for the various driven components of the machine as well as for the traction wheels 3. A conventional header (not shown) and straw elevator 8 extend forwardly of the main chassis 2. The header and straw elevator 8 are pivotally secured to the chassis 2 for generally vertical movement which is controlled by extensible hydraulic cylinders.

As the combine harvester 1 is propelled forwardly over a field with standing crop, the latter is severed from the stubble by a sickle bar on the header, whereafter a reel and a header auger convey the cut crop to the straw elevator 8 which supplies it to the threshing and separating mechanism. The crop received within the threshing and separating mechanism is threshed and separated; that is to say, the crop (which may be wheat, corn, rice, soybeans, rye, grass seed, barley, oats or other similar crops) is rubbed and beaten, whereby the grain, seed or the like, is loosened and separated from the straw, stalks, coils or other discardable part of the crop.

Grain which has been separated from the straw falls onto the grain cleaning mechanism (not shown) which comprises means to separate chaff and other impurities from the grain, and means to separate unthreshed crop material (tailings). Cleaned grain is then conveyed to the graintank 7 by a clean grain conveyor 11 comprising a lower paddle type elevator 12 and an upper, so-called "bubble-up" auger 13. The tailings either may be returned via a tailings conveyor to the threshing mechanism for reprocessing or otherwise, may be reprocessed in a separate tailings rethresher and returned to the cleaning mechanism for a repeat cleaning action.

Figure 2:
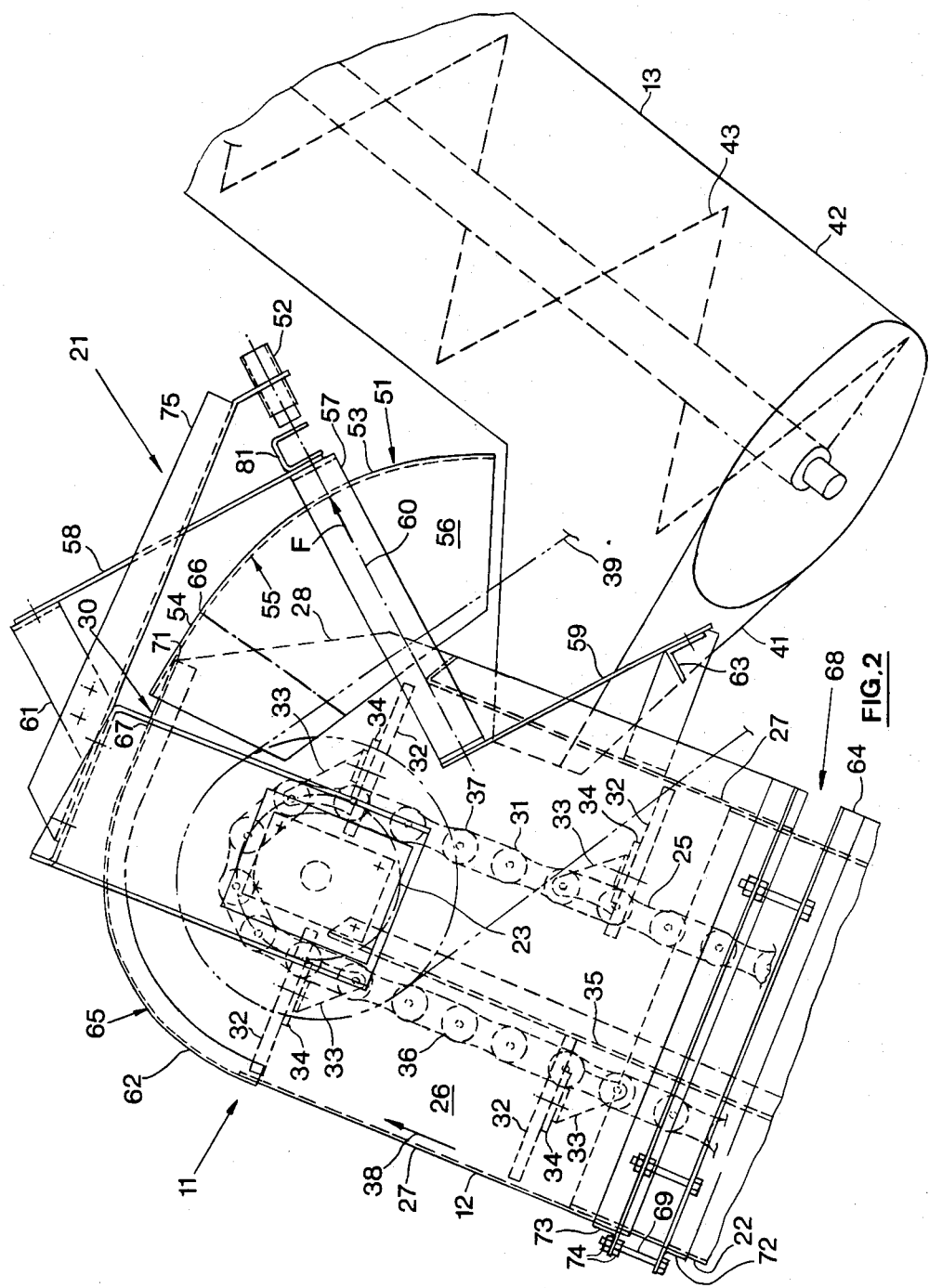
FIG. 2 is a fragmentary view on a larger scale of specific components shown only schematically in FIG. 1.

The clean grain conveyor 11 is fitted with a grain metering device, indicated generally at 21 in FIG. 1 and shown in greater details in FIG. 2. The grain metering device 21 is provided generally at the transition between the paddle-type elevator 12 and the "bubble-up" auger 13. A similar metering device may be provided on the tailings conveyor to measure the tailings flow rate. However, as both metering devices principally are identical, only the clean grain metering device will be described hereafter with reference to the accompanying drawings.

The clean grain conveyor 11 is otherwise conventional in many respects. The paddle-type elevator 12 comprises an elongated housing 22 of generally rectangular cross section. Upper and lower sprockets, respectively 23 and 24, are mounted in the housing 22 in alignment with respect to each other for an endless paddle conveyor 25 to extend therearound. The housing 22 has a pair of opposed side walls 26 which extend parallel to the plane defined by the paddle conveyor 25. One of said side walls 26 has a circular inlet opening generally co-axially with the lower sprocket 24. A transverse wall 27 interconnects both side walls 26 and arcuately extends around the lower sprocket 24 and partially also around the upper sprocket 23. A generally rectangular outlet opening 28 is provided in the transverse wall 27 at the upper end of the elevator housing 22 and downstream of the upper curved portion 65 of said transverse wall 27.

The paddle conveyor 25 comprises an endless chain 31 on which the paddles 32 are mounted at regular intervals on pairs of angled brackets 33 carried by the appropriate chain links with each pair attached to a metal support plate 34 to which, in turn, is connected a paddle 32 composed of a flexible material, although being sufficiently rigid for the intended load carrying function. As is generally known in the art, each paddle 32 is spaced from the two opposed side walls 26 and from the transverse interconnecting wall 27. However, each paddle 32 is in sliding contact with an intermediate wall 35 which divides the operative and return runs 36, 37 of the elevator 12.

The paddle conveyor 25 is driven in the direction 38 via a chain-and-sprocket transmission 39 communicating motive power to the upper sprocket 23 and whereby, in operation, the paddles 32 convey grain through the operative run 36 along the intermediate wall 35 and finally discharge said grain through the outlet 28.

Grain, which is elevated by the paddle-type elevator 12, is transferred via the flow metering device 21, to be described in more details hereafter, to the "bubble-up" auger 13, which is inclined inwardly of the machine and has a discharge end 40 generally above the center of the graintank 7. The "bubble-up" system 13 comprises an inlet basket 41 disposed in receiving relationship to the elevator outlet 28 and the metering device 21 and which itself communicates with a tubular body 42 comprising an auger 43 which is driven in a conventional manner.

The grainflow metering device 21 basically comprises a resiliently mounted sensor member 51 disposed to be subjected to centrifugal forces from the layer of crop material, and a load cell 52 operable to sense the displacement of the sensor member 51 as a result of the forces acting thereon.

The sensor member 51 is very simple in construction. It is a sheet metal structure which is generally U-shaped in cross-section and which is disposed in overlapping relationship with the outlet opening 28 of the paddle-type elevator 12 without however making any physical contact with any wall portion thereof. The bottom 53 of the U-shape (actually generally the upper wall portion thereof as the U-shape is positioned generally upside-down) comprises a generally rectilinear section 54 disposed to overlap the discharge edge 71 of the transverse wall 27 of the elevator housing 22 and which is connected to a circularly curved wall 55 of about 70°. Connected to both the rectilinear wall section 54 and the curved wall section 55 are the opposed side walls 56 forming the limbs of the U-shape and which overlap the elevator side walls 26 without making any physical contact therewith.

A mounting frame 57, which equally is of U-shape, is secured to the sensor member 51 at a location generally coincident with the bisector 60 of the circularly curved wall portion 55. The sensor member 51 is mounted in the operative position relative to the discharge opening 28 of the elevator 12 by three leaf springs 58, 59 which all are coupled at one end to the aforementioned mounting frame 57. A first leaf spring 58 extends between a central portion of the base of the U-shape of the mounting frame 57, on the one hand, and a support 61 on the elevator head 62, on the other hand, and is oriented generally perpendicularly to the bisector 60 of the curved wall portion 55. A further pair of leaf springs 59 is transversely spaced apart with one leaf spring 59 thereof being provided at each side of the sensor member 51 and being coupled at one end to the corresponding limb of the U-shaped mounting frame 57 and at the other end to a transverse mounting beam 63 on the elevator head 62. The leaf springs 59 again extend generally perpendicular to the bisector 60. Said pair of leafsprings 59 and the first leaf spring 58 extend away from the bisector 60 at opposite sides thereof. This mounting arrangement of the sensor member 51 guarantees that, for a minimal deflection of the leaf springs 58 and 59, the sensor member 51 is displaced generally in the direction of the bisector 60.

The relative position and orientation of the discharge end 30 of the transverse elevator wall 27 and the sensor member 51 have been found to be critical and preferably should be so that the extension of the rectilinear section 67 of the transverse elevator wall 27 intersects the sensor member 51 at the interconnection 66 between the rectilinear and curved sensor sections 54 and 55. In other words, the curved section 55 of the sensor member 51 should be inclined slightly inwardly relative to the path of the grain flow. The angle between this path and the tangential to the sensor surface 55 at the point of interception 66, i.e. the theoretical inlet of the sensor surface 55, preferably is 5°.

It further also has been experienced that the relative position of the path of the paddles 32, the upper sections 65 and 67 of the transverse elevator wall 27 and the elevator outlet 28, is critical and preferably should not be variable. As is generally known in the art, the upper sprocket of a conventional grain elevator is adjustable lengthwise of the elevator body to take up eventual wear and/or stretch of the elevator chain. Such adjustment would adversely affect the operation of the grain flow metering device. To avoid this, the upper sprocket 23 is mounted at a fixed position in the elevator head 62 and thus the path of the paddles 32 invariably remains at the same relative position with respect to the sections 65 and 67 of the transverse elevator wall 27. However, the elevator body, in a sense, is made telescopingly. Indeed, said elevator body is divided at 68 and both portions 62, 64 telescopingly fit into each other. Bolts 69 are welded to a collar 72 on the lower elevator part 64 and are arranged to extend through apertures in a collar 73 on the elevator head 62. Adjustment nuts 74 on the bolts 69 on both sides of the collar 73 enable adjustment of the elevator head 62 relative to the rest of the elevator body, whereby the slack in the elevator chain 31 can be taken up. However, such adjustment does not vary the relative position of the path of the paddles 32 and the walls of the elevator head 62.

Moreover, as the sensor member 51 is mounted via the leaf springs 58, 59 on the elevator head 62, also the relative position of these components remains the same when adjusting the elevator head 62 to take up slack in the elevator chain 31. Furthermore, the load cell 52 equally is fixedly mounted on the elevator head 62 by a support 75.

The inlet basket 41 of the "bubble-up" auger structure 13 is provided in crop receiving relationship relative to the sensor means 51 without however making any physical contact therewith. Grain received therein is conveyed to the auger 43 and is further transported thereby for dumping into the graintank 7.

The load cell 52 is positioned in close proximity to a metal part 81 of the sensor member 51 and is a commercially available displacement detector which is operable to generate an electrical signal which is proportional to the displacement of the metal part 81 in the direction toward the load cell 52. The load cell 52 is coupled to an electronic box 85 including a.o. a digital integrator with a V/F (voltage/frequency) convertor and a microprocessor circuitry.

The electronic circuitry further also includes an acreage counter having a sensor 86 associated with e.g. one of the steerable wheels 4. An operator input 87 may be provided in the acreage counter circuitry for setting the circuitry for any given header width and any given wheel diameter.

A further input to the electronic circuitry may be provided by one or two inclinometers 91 to compensate for influences from the longitudinal and/or transverse inclination of the combine harvester on the grain flow rate metering results as indeed such influence, although relatively small, still may reach an unacceptable level. Only one inclinometer 91 is shown in FIG. 1. The inclinometer 91, as shown, is operable to detect the longitudinal inclination of the harvesting machine. Inclinometers are commercially available on the market. The inclinometer shown in principle in FIG. 1, comprises a pendulum weight 92 with an eccentric surface 93 which is pivotally movable in proximity of a sensor 94. This sensor 94 preferably is similar to the load cell 52 associated with the flow sensor 51. The output signal from the inclinometer sensor 94 is relayed to the electronic circuitry to correct the signal received from the flow sensor member 51 to compensate for the influence from operation of the combine on slopes.

The electronic box 85 may comprise, as is conventional, an on-off switch 88, a warning light 89 and a digital display screen 90. The electronic box 85 further also comprises a selector knob 95 positionable in a range of positions for generating a read-out on the display screen 90 such as, for example, the speed in kilometers per hour or hectares per hour, the capacity in tons per hour, and the yield in tons per hectare. The selector knob 95 also may be positioned to generate a summation giving either the total distance in kilometers, the total acreage in hectares or the total yield in tons.

As is conventional, the circuitry further also comprises a number of enabling switches to enable the microprocesor circuitry only when the harvester effectively is operating. These enabling switches may comprise a header switch, a threshing switch and a forward speed switch. The header switch enables the circuitry only when the header is in the lowered operative position. The threshing switch enables the circuitry only when the threshing cylinder is rotating and finally the speed switch enables the circuitry only when the combine harvester has a forward drive speed exceeding a preselected value, such as for example one kilometer per hour.

During harvesting operation, the elevator paddles 32 are operable, as is conventional, to convey successive quantities of clean grain along the intermediate wall 35. As this grain is conveyed around the upper sprocket 23, it is moved radially outwardly under influence of centrifugal forces imparted thereto by the paddles 32, which at that point in the elevator 12, pivot around the shaft of the upper sprocket 23. Thereby the successive quantities of grain carried by the successive paddles 32 are urged against the curved section 65 and the rectilinear section 67 of the transverse elevator wall 27 to form there a coherent layer of grain kernels. This coherent layer is forcefully ejected through the elevator outlet 28 in a direction generally tangential to the wall section 67 at the discharge edge 71 thereof and whereby it thus is caused to engage the sensor member 51 generally at the inlet 66 thereof and whereafter it is deflected inwardly by the sensor member 51 and guided further therealong through a curved path until it reaches the "bubble-up" system 13.

The layer of grain kernels thus deflected and guided along the sensor member 51 exerts a force F in the direction of the bisector 60 on said sensor member 51 and which is proportional to the weight of the grain. This force F on the sensor member 51 is operable to produce a minimal deflection to the springs 58, 59 thus allowing a minimal, generally linear displacement of said sensor member 51 in the direction of the bisector 60. This minimal displacement, which preferably, at the maximum, is no more than e.g., 2 mm, is detected with the load cell 52 which, in turn, generates an electrical voltage signal which equally is proportional to the weight of the grain issuing from the elevator 12. This signal is relayed to the electronic circuitry where it is applied to the V/F convertor to convert it into a signal which is compatible with the acreage counter signal. Both signals, i.e., the flow rate signal and the acreage signal are applied to the microprocessor circuitry which is programmed to produce, at wish of the operator, a reading in kilometers per hour, hectares per hour, tons per hour, tons per hectare, kilometers, hectares or tons. Obviously, the read-out in tons per hour, tons per hectare and tons provide the most interesting information to the operator.

Obviously, to obtain an accurate metering result, it is necessary for all the grain kernels to contribute to the centrifugal forces exerted on the sensor member 51, or, in other words, all grain kernels should form a compact layer fully in engagement with the sensor member 51 as it is moved therealong, or said still otherwise, grain kernels should not move in a dispersed manner through the flow metering device. Accordingly, the elevator wall sections 65, 67 and the paddles 32 when turning around the upper sprocket 23, have an important preparatory function to the extent that these components contribute to conditioning the grain flow for being metered as described. Indeed, these paddles 32 in conjunction with the wall sections 65, 67 of the elevator housing cooperate to form, by centrifugal action, a coherent stream of grain kernels at an outer radius. This coherent stream of grain kernels is presented to the sensing surface 55 of the sensor member 51 at the inlet 66 thereof and is permanently held in contact with said sensing surface 55 as it is guided along the length thereof. All kernels in this coherent stream continuously contribute to the same extent to the centrifugal action on the sensor member 51 during the passage therealong. This centrifugal action is the measure for the weight rate.

As already said, the relative position and orientation of the terminal elevator wall portions 65, 67 and the sensor wall portion 55 are found to be critical and preferably should be so that, at the inlet 66 where, theoretically, the layer of grain kernels engages the sensor wall portion 55, said wall portion 55 should be inclined inwardly relative to the direction of flow of the layer by about 5°. A smaller angle would result in too large a fluctuation of the point of interception or inlet 66 along the length of the sensor member 51 whereby correspondingly, the bisector of the sector actually metering the flow equally would shift too much and thus, the load cell 52 not always would measure the force F along the actual bisector. It is important to measure the linear displacement of the sensor member 51 in the direction of the bisector 60 to eliminate distortions of the metering results by the frictional forces of the grain on the sensor member 51.

Indeed the components of the frictional forces in the direction of the bisector 60 and measured at the opposed sides of the bisector, are identical though opposed to each other so that they compensate each other. Consequently the position of the point 66 of the sensor member 51 relative to the discharge edge 71 of the elevator housing 22, i.e., the point where, theoretically, the layer of grain kernels engages the sensor member 51, is critical to the extent that if this point would be displaced along the length of the sensor member, the load cell 52 no longer would coincide with the bisector. This is also the reason for allowing the sensor member 51 to make only a minimal displacement of preferably no more than 2 mm between zero and full capacity.

If, on the other hand, the aforementioned angle between the sensor wall portion 55 and the direction of the path of the grain kernels at the point of interception or inlet 66 were much larger, the grain kernels then would impact on said wall portion 55, which not only would disturb the measurement as the force F would be larger, but also possibly could disturb the regular flow of the layer of kernels along the sensor surface to the extent that the grain may spatter and thus the layer would not remain in constant contact with the sensor surface. This is still another cause for distortion of the metering results as indeed, under these conditions, the flow metering device no longer has a linear behaviour.

As far as the gravity forces are concerned, the influence thereof is neglectable in comparison with the centrifugal forces actually measured, provided of course the grain flow has a sufficiently high initial speed.

So far, the invention and its operation have been described in connection with a clean grain elevator 12 on a combine harvester for metering the flow of clean grain. The invention obviously also advantageously can be used in other combinations and, as already said, the flow metering device according to the invention indeed effectively also can be used for metering the tailings flow in the tailings return mechanism on a combine harvester. The flow metering device according to the invention also can be used in other agricultural and nonagricultural equipment which either can be mobile or stationary. Accordingly, the invention is not limited to the application on a combine harvester or any other agricultural machine or equipment handling or processing granular material. It is even not limited to the use for metering granular material as such. Indeed, it also successfully can be used for metering the flow rate of other materials such as, on the one hand, powdery material and, on the other hand, liquid material.

Figure 3:
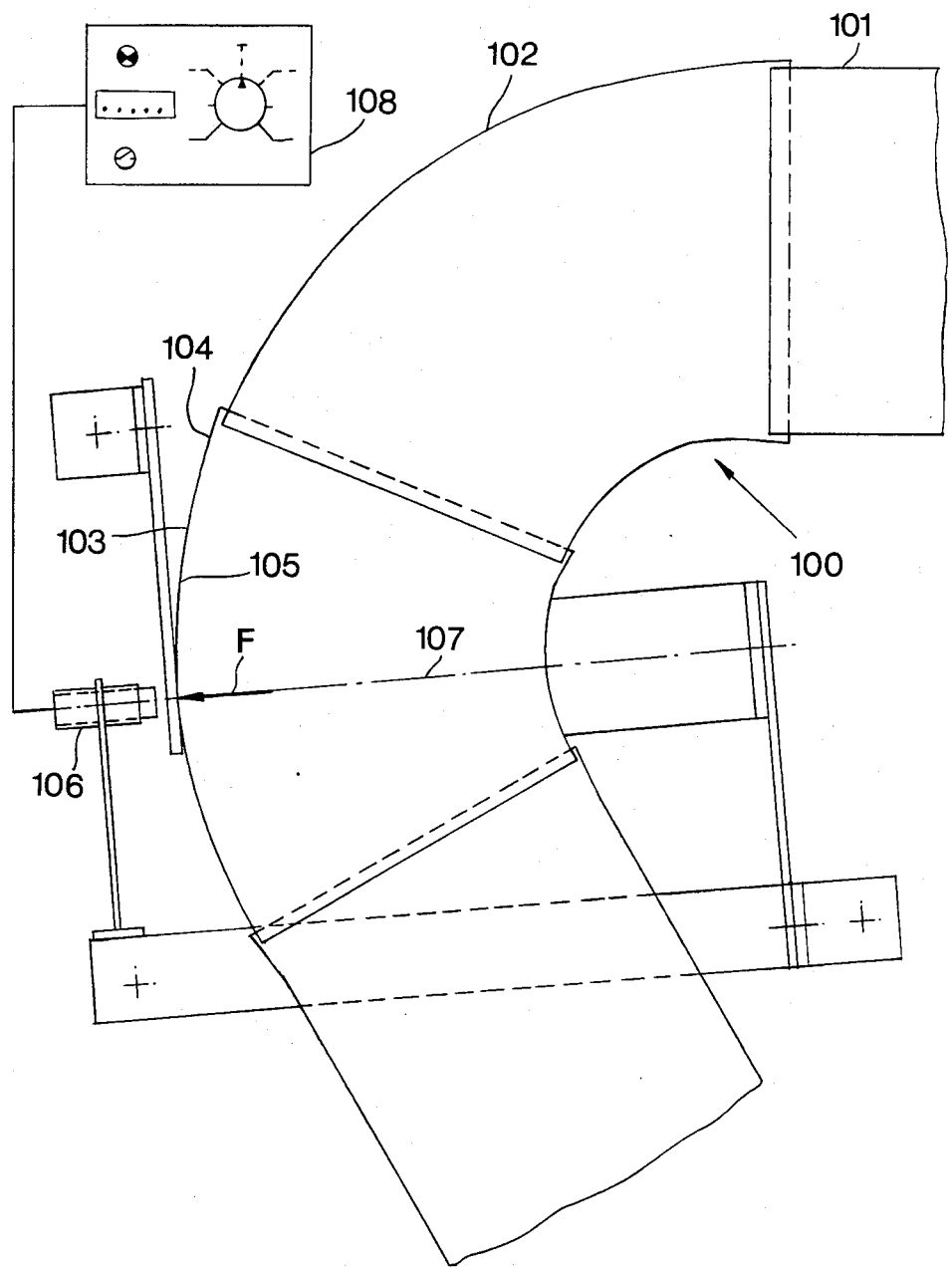
FIG. 3 is a diagrammatic depiction of the inventive combination in its broadest concept.

In its broadest definition and with reference to FIG. 3, the invention combines in a conveyor means 100 for conveying materials the following elements:

(a) a feeder 101 for inducing a minimal speed to a flow of material;

(b) a conditioning means 102 for concentrating all the material in a coherent stream;

(c) a curved sensor member 103 disposed to receive the conditioned flow of material at an inlet 104 and to deflect and guide said flow in an arcuate path along and in contact with the sensor surface 105 of said sensor member 103;

(d) a load cell 106 associated with the curved sensor member 103 and operable to generate a signal proportional to the centrifugal forces of the flow of material acting thereupon; and (e) signal processing means 108 coupled to the load cell 106 for generating an indication of the weight rate of the flow of material.

The feeder 101 in this combination, may be of any type such a paddle-type conveyor, an auger conveyor, a belt conveyor, a pneumatic conveyor, etc.; it being important for the metering operation only that the feeder induces a given minimal speed to the flow of material so that subsequently centrifugal forces can be measured. This minimal speed should be sufficiently high to avoid any substantial disturbance of the metering results by the gravitational forces.

The conditioning means 102 again may be of any type, provided that they are operable to concentrate all the material of the flow of materials in a coherent manner, i.e., bringing dispersedly moving particles into a coherent stream of particles. In its simplest form, such conditioning means 102 may be formed by a bent in the conveyor duct such that, material flowing therethrough at a predetermined speed, is concentrated, by centrifugal action, into a layer at the outer radius of the bent.

The curved sensor member 103 generally may correspond to the sensor member 51 incorporated in the combine harvester clean grain elevator for metering a clean grain flow as described in great length hereabove with reference to FIG. 2 and thus, a description should not be repeated here, except maybe that it should be noted here that, in principle and as shown in FIG. 3, the sensor surface 105 at the inlet 104 of the curved sensor member 103 may be positioned generally tangentially to the path of the materials flow as it issues from the conditioning means 102. At least, this is the theoretical approach and, in practice, it has been experienced that better results may be obtained when the sensor surface 105 at the inlet 104 of the curved sensor member 103 is positioned generally between a tangential position to the path of the materials flow and a position inclined inwardly with respect to said tangential position. The angle of inclination between the direction of the materials flow at the inlet 104 of the sensor member 103 and the tangential to said sensor surface 105 at said inlet 104 preferably is in the range of 5°.

The load cell 106 and the electronic circuitry coupled thereto equally may be similar to the load cell 52 and the associated circuitry described in connection with the grain flow metering device shown in FIGS. 1 and 2 and therefore will not be described here in any further details.

While that the sensor members 51, respectively 103 described herebefore, are resiliently mounted and the associated load cells 52, respectively 106 are linear displacement sensors, it will be obvious that other arrangements are conceivable. Indeed, the sensor members 51, 103 also could be mounted in a fixed position, in which case the load cells 52, 106 should be of a different type and should be operable to directly sense a force (load) rather than a displacement proportional to a force.

More generally, it will be understood that various changes in the details, materials, steps and arrangement of parts, which have been described and illustrated to explain the nature of the invention, will occur to and may be made by those skilled in the art upon a reading of the disclosure within the principles and scope of the invention.

The foregoing description illustrates preferred embodiments of the invention. However, concepts, as based on such a description, may be employed in other embodiments without departing from the scope of the invention. Accordingly, the following claims are intended to protect the invention broadly, as well as in the specific form shown herein.

Having thus described the invention, what is claimed is:

1. In a conveyor means for conveying solid materials, a flow metering device for metering the weight rate of the materials flow having a curved sensor member disposed to receive the materials flow in an arcuate path along its sensor surface while being subjected to centrifugal forces resulting from the deflection of the path of movement of the materials flow; a load cell associated with the curved sensor member and operable to generate a signal proportional to said centrifugal forces; and signal processing means coupled to the load cell for generating an indication of the weight rate of the material flow, the improvement comprising:

an open, non-pressurized mechanical transporter provided forwardly of the sensor member for inducing said material to move along a flow path at a predetermined rate of speed;

conditioning means provided between the transporter and the curved sensor member for concentrating, in a coherent stream, all the material of the materials flow received from the feeder means and for transferring said coherent stream to the sensor member along the curved surface thereof for guiding said coherent stream along said sensor member in continuous contact with the sensor surface; and said sensor member being positioned such that the sensor surface is inclined inwardly at an angle relative to the direction of the crop materials flow as it issues from the conditioning means.

2. The flow metering device according to claim 1 wherein the curved sensor member is resiliently mounted to allow a generally linear displacement thereof generally in the direction of the bisector of the sensor surface as a result of the centrifugal forces acting thereupon, the load cell being generally aligned with said bisector and operable to sense said displacement and to produce a signal proportional therewith.

3. The flow metering device according to claim 2 wherein the conditioning means are formed by a bend in the conveyor means such that material flowing therethrough at said predetermined speed is concentrated by centrifugal action into said coherent stream in engagement with said bend, the sensor member having its sensor surface disposed in material receiving relationship at the bend of the conditioning means.

4. In a combine harvester having a crop material conveyor means and a crop weight rate metering device associated therewith generally at the discharge end thereof, the weight rate metering device including a sensor member disposed to be acted upon by the crop material flow at it issues from the conveyor means and a transducer operatively associated with the sensor member to generate a signal proportional to the crop material weight rate, the improvement comprising:

the sensor member is curved in shape and is operatively disposed generally in the path of the crop materials flow issuing from the conveyor means for deflecting the direction of movement of the crop materials flow and for guiding said flow therealong while subjecting the sensor member to a centrifugal force, said sensor member having a generally circularly curved sensor surface which is disposed to receive the flow of crop material at an inlet and to deflect and guide the flow of crop material therealong while being subjected thereby to said centrifugal force, said sensor surface at the inlet of the sensor member being positioned such that the sensor surface at the inlet is inclined inwardly at an angle relative to the direction of the crop materials flow as it issues from the conveyor means.

5. The combine harvester according to claim 4 wherein said sensor surface is inclined inwardly with an angle in the range of 5° relative to the direction of the crop materials flow as it issues from the conveyor means.

6. The combine harvester according to claim 5 wherein the sensor surface spans an arc in the range of 70° and is extended in overlapping respect to the discharge end of the conveyor means without making any physical contact therewith.

7. The combine harvester according to claim 6 wherein the sensor member is generally U-shaped in cross section with the bottom of the U-shape being formed by the sensor surface and with the limbs of the U-shape overlapping the discharge end of the conveyor means without making any physical contact therewith.

8. A combine harvester according to claim 7 wherein the sensor member is resiliently mounted relative to the discharge end of the conveyor means for allowing displacement generally in the direction of the bisector of the sensor surface under influence of said centrifugal force; the transducer being formed by a load cell disposed to sense said displacement and to generate an electrical signal which is generally proportional to the weight rate of the crop material acting upon the sensor surface.

9. The combine harvester according to claim 8 wherein the resilient mounting of the sensor member comprises at least one leaf spring means mounting the sensor member in the operative position relative to the conveyor means; the leaf spring means being coupled to the sensor member generally at a right angle to the bisector of the sensor surface.

10. A combine harvester according to claim 8, wherein the resilient mounting of the sensor member comprises first and second leaf spring means mounting the sensor member in the operative position relative to the conveyor means; the first and second leaf spring means being coupled to the sensor member generally at right angles to the bisector of the sensor surface and extending away from said bisector at opposite sides thereof.

11. The combine harvester according to claim 10, wherein the conveyor means comprise crop flow conditioning means forwardly of the sensor member for concentrating the crop materials flow in a coherent stream; the sensor member having its sensor surface disposed with its inlet in crop material receiving relationship to the conditioning means for allowing all the material of the crop materials flow to continuously act upon said sensor surface as it is deflected and guided along the length thereof.

12. The combine harvester according to claim 11 wherein the crop conveyor means are in the form of a paddle-type elevator having an elongated housing with a generally rectangular cross section and an endless paddle conveyor extending and movable around upper and lower guide means in the elevator housing and, on the other hand, the conditioning means being formed by the paddles of the paddle conveyor as they move around the upper guide means, in conjunction with a transverse wall section of the elevator housing extending generally around the upper guide means and forwardly of the elevator outlet; the arrangement being such that, in operation, crop material is conveyed by the paddles around the upper guide means and is centrifugally urged radially outwardly against said transverse wall section to form said coherent stream prior to being transferred to the sensor member.

13. The combine harvester according to claim 12 wherein the elevator housing comprises a lower main portion and an upper elevator head telescopingly mounted relative to the lower main portion, and the upper guide means being mounted at a fixed position within the elevator head; the transducer being mounted at a fixed position on the elevator head, and the sensor member being resiliently mounted on the elevator, such that adjustment of the elevator head relative to the main portion of the elevator housing to take up slack in the paddle conveyor does not vary the relative position of the path of the paddles as they move around the upper guide means, the transverse elevator wall portion forwardly of the elevator outlet, the transducer and the sensor member.

14. The combine harvester according to claim 13 wherein the crop weight rate metering device also comprises an electronic circuitry including signal processing means; the transducer and an acreage counter being operatively coupled thereto, such that the signal processing means are operable to produce a signal indicative of the crop weight rate.

15. The combine harvester according to claim 14 the crop weight rate metering device further comprises at least one inclinometer which is operatively coupled to the electronic circuitry to compensate for the distortion of the weight rate metering results due to operation of the combine harvester on uneven ground.

* * * * *